(12) United States Patent
Grohmann et al.

(10) Patent No.: US 11,499,037 B2
(45) Date of Patent: Nov. 15, 2022

(54) ROLL COVER, ROLL, AND USE OF SAID ROLL

(71) Applicant: VOITH PATENT GMBH, Heidenheim (DE)

(72) Inventors: Franz Grohmann, Schmidsdorf (AT); Anton Horak, Vienna (AT); Nina Eggers, Neunkirchen (AT); Stefan Pollaschek, Traiskirchen (AT)

(73) Assignee: Voith Patent GmbH, Heidenheim (DE)

( * ) Notice: Subject to any disclaimer, the term of this patent is extended or adjusted under 35 U.S.C. 154(b) by 962 days.

(21) Appl. No.: 16/321,704

(22) PCT Filed: Jul. 25, 2017

(86) PCT No.: PCT/EP2017/068736
§ 371 (c)(1),
(2) Date: Jan. 29, 2019

(87) PCT Pub. No.: WO2018/019816
PCT Pub. Date: Feb. 1, 2018

(65) Prior Publication Data
US 2021/0284825 A1    Sep. 16, 2021

(30) Foreign Application Priority Data
Jul. 29, 2016   (DE) .......................... 102016114013.9

(51) Int. Cl.
| | |
|---|---|
| *C08L 9/02* | (2006.01) |
| *C08L 15/00* | (2006.01) |
| *D21G 1/02* | (2006.01) |
| *C08L 75/04* | (2006.01) |
| *D21F 3/08* | (2006.01) |

(52) U.S. Cl.
CPC ............... *C08L 9/02* (2013.01); *C08L 15/005* (2013.01); *D21F 3/083* (2013.01); *D21G 1/0253* (2013.01); *C08L 75/04* (2013.01)

(58) Field of Classification Search
CPC ............ D21F 3/083; D21F 3/08; D21F 3/086
See application file for complete search history.

(56) References Cited

U.S. PATENT DOCUMENTS

| | | | | |
|---|---|---|---|---|
| 2014/0345821 | A1* | 11/2014 | Putschoegl | ............... D21F 3/08 525/274 |
| 2015/0018184 | A1 | 1/2015 | Putschoegl et al. | |

FOREIGN PATENT DOCUMENTS

| | | | | |
|---|---|---|---|---|
| DE | 10151485 | A1 | 5/2003 | |
| DE | 102004057480 | A1 | 5/2006 | |
| DE | 102009029045 | A1 | 3/2011 | |
| DE | 102012201314 | A1 | 8/2013 | |
| WO | WO-03035975 | A1 * | 5/2003 | ........... D06B 23/021 |

OTHER PUBLICATIONS

English Translation of WO 2003035975 A1 (Year: 2003).*

* cited by examiner

*Primary Examiner* — Jason L Vaughan
(74) *Attorney, Agent, or Firm* — Laurence A. Greenberg; Werner H. Stemer; Ralph E. Locher

(57) ABSTRACT

A roll covering includes a functional layer formed of a polymer which is a blend of at least one rubber and one millable polyurethane rubber. The polymer includes from 65% by weight to 85% by weight of the at least one rubber and from 15% by weight to 35% by weight of the millable polyurethane rubber. A roll having the roll core, a method of using the roll and a combination of the roll and a heated drying cylinder are also provided.

14 Claims, 1 Drawing Sheet

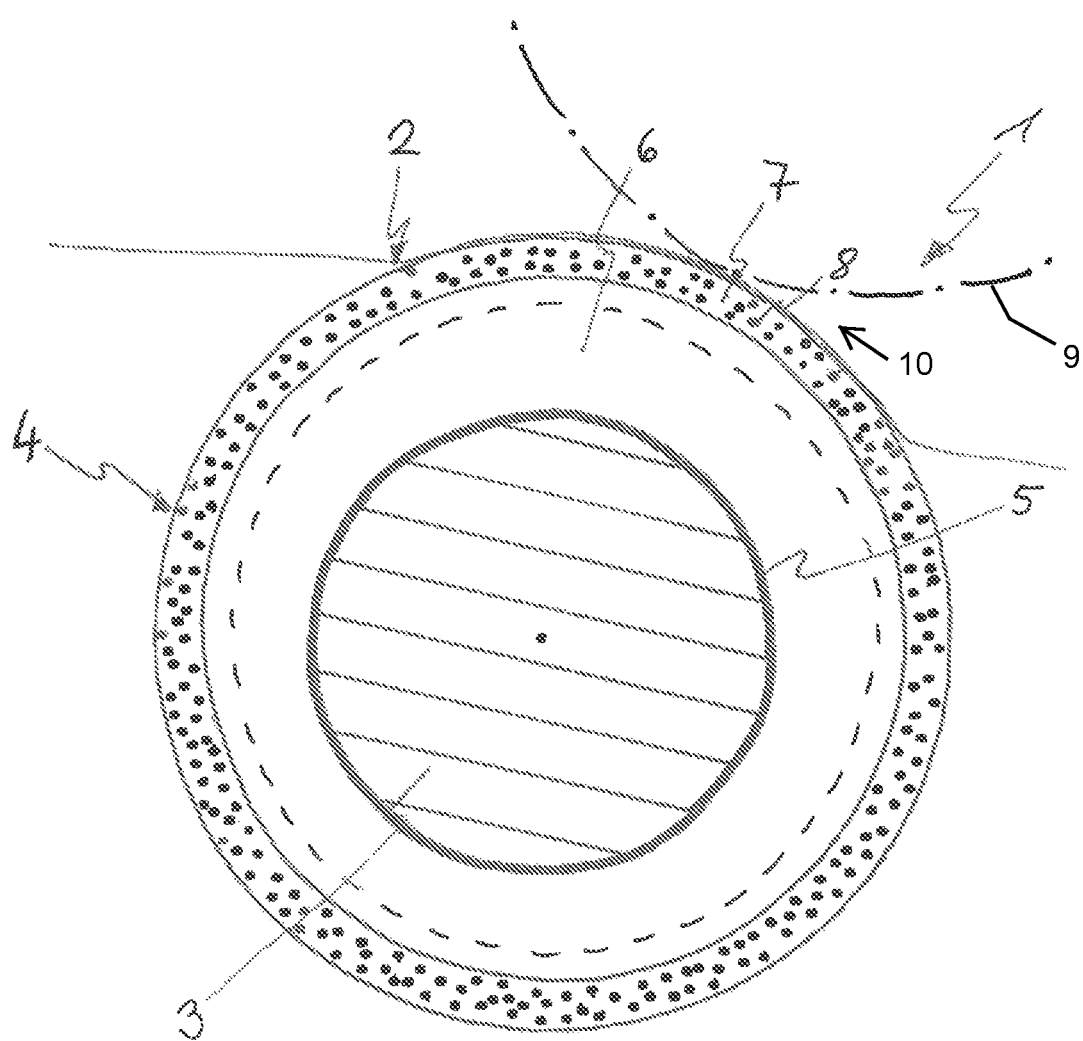

ROLL COVER, ROLL, AND USE OF SAID ROLL

BACKGROUND OF THE INVENTION

Field of the Invention

The present invention relates to a roll covering suitable in particular for a roll for the treatment of a paper web, paperboard web, tissue web or any other fiber web in a machine for the production and/or finishing of same, to a roll comprising said roll covering, and to the use of such a roll.

Many steps in the process of papermaking use rolls, and in particular rolls with a resilient surface. The latter are used by way of example during sheet formation on the wire in the papermaking machine, during drainage in the press section of the papermaking machine and during coating, drying, and also calendering in the final section of the papermaking machine. In this type of case, the radially outermost surface of such a roll in some positions in the papermaking machine is in almost constant contact with the paper web. Rolls of this type are therefore exposed to high mechanical loads during operation of the papermaking machine. Irrespective of the above, said rolls must have low susceptibility to cracking, high impact resistance, good tensile strength, high tear strength, high compressive strength and sufficient hardness. At the same time, the abrasion resistance and wear resistance of the rolls must be sufficient to maximize lifetime.

The usual method of providing roll surfaces with the performance characteristics required for their use is to provide, on the roll surface, a roll covering arranged on a roll core and composed of material formulated with a view to the required performance characteristics.

Rolls of this type are exposed to high temperatures particularly when used as press rolls, coating rolls or sizing rolls. These temperatures can even exceed 120° C. during operation. Surfaces of these rolls, which generally had a liquid-transfer function, are therefore subject to a certain level of thermal stress. Rubber rolls known from the prior art, consisting of vulcanized rubber, have hitherto been used for this purpose. Although these provide good mechanical properties, they exhibit a tendency toward continuing vulcanization during operation of the papermaking machine at such high temperatures. This results in excessive hardening and embrittlement of the roll coverings. Another finding is that, during correct operation, the continuing vulcanization on such rolls increases the hardness of the external surface of the roll covering.

Another approach to a solution has hitherto been use of polyurethane instead of roll coverings made entirely of rubber. This has the disadvantage that polyurethane begins to swell on contact with liquid, in particular with water. This in turn softens the external surface of such a roll. Problems arising from increased dimensions are analogous to those caused by the continuing vulcanization of rubber roll coverings. Polyurethane moreover has lower resilience than rubber and inferior dynamic properties.

Hardening or softening of the roll covering changes the characteristics of the nip. This affects the quality of the paper thus produced or treated.

DE 101 51 485 A1 discloses a roll covering for a roll to be used in a papermaking machine where the roll covering comprises a blend of rubber with a polyurethane rubber. Although the blend improves mechanical requirements in comparison with a roll covering made entirely of rubber or entirely of polyurethane, the thermal properties of such a roll covering are still inadequate for the applications mentioned in the introduction.

The present invention relates to products of this generic type.

SUMMARY OF THE INVENTION

It is therefore an object of the present invention to provide a roll covering and a roll, both of which are improved in comparison with the prior art: a particular intention is to increase the heat resistance of such rolls and, respectively, roll coverings. Such rolls and, respectively, roll coverings thus permit long-term use of these particularly in applications at high temperatures above 120° C. A further intention is to minimize the resource required for servicing rolls of this type during correct operation, and also to minimize the resultant costs.

This object is achieved in the invention via the independent claims. The dependent claims describe particularly advantageous embodiments of the invention.

The inventors have discovered that the dimensional stability and the mechanical and thermal properties of such rolls and roll coverings can be significantly improved by selecting the components and their composition in accordance with the invention. Because the proportion by weight of the millable polyurethane rubber in relation to the conventional rubber is in accordance with the invention, the roll covering obtained has particular thermal stability. If, for example, the selected proportion of millable polyurethane rubber is from 22% by weight to 28% by weight, a particularly satisfactory result is achieved in respect of heat resistance. This was surprising because on the basis of the knowledge available hitherto the assumption had to be that the most satisfactory solution would be a 1:1 mixture of rubber and polyurethane rubber: DE 101 51 485 A1 also indicates that the proportion of polyurethane rubber can be significantly increased in comparison with that of the other rubber, but the inventors have established that the advantages of the invention are also obtained when—or are obtained precisely because—the selected proportion by weight of the polyurethane rubber is significantly smaller than 50% by weight. There has hitherto been no conclusive clarification as to why a smaller proportion of polyurethane rubber is thus better.

It has moreover been found that the lifetime of such a roll exposed to high thermal stress is increased when the rubber content of the roll covering consists of a mixture of NBR and HNBR.

The expression "millable polyurethane rubber" in the invention means a polymer which is in the solid state at room temperature, in particular an elastomer. Unlike polyurethanes that are liquid at room temperature, i.e. are pourable, millable polyurethane rubbers can (exclusively) be processed by conventional rubber-processing systems such as internal mixers, and on roll mills. They begin to flow only as a consequence of the mechanical action of said systems. Polyurethane rubbers feature a stoichiometric deficit of isocyanate groups in relation to hydroxy groups in the overall reaction, with a resultant slight, but positive excess of hydroxy groups. In contrast, liquid polyurethanes have a slight excess of isocyanate groups. As in other synthetic rubbers, there are crosslinking sites present in the polyurethane rubber which permit formation of three-dimensional networks by means of peroxide or sulfur. Sulfur crosslinking additionally required double bonds at the crosslinking site. Suitable crosslinking substances are the following: trimethylolpropane monoallyl ether, glycerol monoallyl ether, 2-butene-1,4-diol and hydroxy-terminated polybutadiene. These compounds should be at least difunctional in relation to OH-functionality and comprise at least one double bond. For peroxidic crosslinking it is not essential to introduce an unsaturated compound. Peroxidic crosslinking can take place in this case by way of the methylene groups in methylenediphenyl 4,4'-diisocyanate.

Polyurethane rubber does not survive melting and therefore differs from the known thermoplastic polyurethane (TPU), which is amenable to plastic deformation when subjected to moderate heating. Roll coverings TPU are therefore not suitable for these high-temperature applications around or above 120° C.

The term "blend" means a mixture of a plurality of single substances homogeneously mixed into one another, i.e. forming a single phase. The term "blend" does not therefore mean a mixture in which two or more phases of said single substances are present. An example of a (two-phase) mixture would, for example, be a polyurethane rubber into which ground rubber particles have been embedded. For the purposes of the present invention, the expression "single substances" means on the one hand the polyurethane rubber and on the other hand the at least one other rubber. Both of those substances can in principle also comprise further additions, for example fillers, and are then still understood to be a single substance. Said blend is generally produced and processed in internal mixers or on roll mills.

When the expression "at least indirectly" is used in the invention, its meaning then comprises the two alternatives "indirectly" and "directly". In the former instance, the term "indirectly" means that, for example, a roll is in indirect contact with a fiber web. A roll is in indirect contact with the fiber web when, for example, during correct operation there is a liquid, for example slip, distemper or water, between said roll and web. The expression "direct contact" means, in contrast that, likewise during correct operation, fiber web and roll or roll covering are in direct contact with one another—touching one another.

The expression "functional layer" in the invention means the surface facing toward the fiber web, i.e. the enveloping surface (radially outermost surface) of the roll covering or of the roll. It is that surface that during correct operation comes into at least indirect contact with the fiber web.

For the purposes of the invention, an intermediate layer is part of the roll covering. In respect of the functional layer, it is a layer separate therefrom which, during correct operation, serves to absorb load from the forces acting on the functional layer. In relation to the longitudinal axis of the roll covering or of the roll, the intermediate layer is generally radial within the radially outermost layer, termed functional layer here, arranged and generally coherently bonded thereto.

The expression "correct operation" means that condition in which the finished resultant (vulcanized) roll covering or the finished roll has been installed in the machine mentioned in the introduction for manufacturing paper, paperboard or tissue, for the purpose of treating same in a machine for the production and/or finishing of the fiber web, and said machine is in operation.

The dimensions of these rolls suitable for such machines are a plurality of meters not only in length (along their longitudinal axis) but also in diameter.

Experiments have shown that the roll covering has particularly good heat resistance when the rubber is selected from the group consisting of crosslinked natural rubbers, crosslinked nitrile rubbers (NBR), crosslinked hydrogenated nitrile rubbers (HNBR), crosslinked carboxylated nitrile rubbers, styrene-butadiene rubbers (SBR), ethylene-propylene-diene rubbers (EPDM) and any desired mixtures of two or more of the abovementioned crosslinked rubbers.

Extremely good heat resistance of the roll covering is also obtained by using a mixture of rubbers made of a crosslinked nitrile rubber (NBR) with a crosslinked hydrogenated nitrile rubber (HNBR), where the proportion of the crosslinked hydrogenated nitrile rubber in relation to the crosslinked nitrile rubber (NBR) does not exceed 50% by weight.

If fillers are embedded into the at least one layer, for example functional layer, so that the functional layer serves as matrix for these, the best fillers have proven to be inorganic. Fillers consisting of aluminum oxide, titanium dioxide, zirconium dioxide, yttrium oxide, silicon dioxide, chromium oxide, chromium carbide, titanium carbide, boron carbide, tungsten carbide, aluminum carbide, boron nitride, aluminum nitride, chromium nitride, niobium nitride, chromium carbonitride, titanium carbonitride, boron carbonitride, tungsten carbonitride, diamond, aluminum silicates, aluminum sodium silicates, calcium silicates, calcium sodium silicates or silicas (precipitated, fumed, surface-treated, e.g. with silanes) and any desired mixtures of two or more of the abovementioned compounds are also particularly suitable for use at high temperature.

If the millable polyurethane rubber has been produced via reaction of a polyol with a diisocyanate and a crosslinking agent, materials particularly suitable for ideal absorption of the mechanical, dynamic and thermal stresses to which the roll covering is exposed are, as polyol, a polyether polyol or polyester polyol, or a mixture of the abovementioned polyols and, as diisocyanate, methylenediphenyl isocyanates (MDI), naphthylene 1,5-diisocyanate (NDI), toluene 2,4-diisocyanate (TDI), phenylene 1,4-diisocyanates (PPDI), polycarbonates or polycarbonatediols (PCDL) or a mixture of the abovementioned diisocyanates. It is possible in principle to use any of the familiar OH-functional polyols, examples being: polyester polyols, polyether polyols and polycaprolactones.

In a particularly preferred embodiment of the present invention which is an alternative to the above, the roll covering consists of the at least one layer, and it is particularly preferable here that the thickness thereof is from 5 to 25 mm. Such an embodiment has proven to be particularly ideal for the applications mentioned in the introduction.

Vulcanizing agent (crosslinking agents) used for the blend of millable polyurethane rubber with the other rubber can be any of the compounds known to the person skilled in the art for this purpose, and specifically vulcanizing agents based on (meth)acrylates, vulcanizing agents based on polysulfides, vulcanizing agents based on sulfur, for example thiourea compounds, vulcanizing agents based on triazine derivatives and vulcanizing agents based on peroxide compounds, preference being given here to vulcanizing agents based on peroxide compounds. Again, these agents have particularly good suitability for high-temperature applications.

The vulcanization of the roll covering can be carried out under the conventional pressure and temperature conditions known to the person skilled in the art, and specifically by way of example in an autoclave at a temperature of from 40 to 170° C. and preferably from 90 to 160° C., and at a pressure of from 2 to 10 bar and preferably from 3 to 5 bar.

A preferred roll covering which is particularly successful in providing the advantages of the invention has been produced from a polymer which is a blend of at least one rubber with one millable polyurethane rubber where the polymer comprises 75% by weight of the at least one rubber and 25% by weight of millable polyurethane rubber. The 75% by weight of the at least one rubber here can consist of 15% of HNBR and 60% of NBR. The conventional chemicals can moreover have been added to the polymer.

The present invention moreover provides a roll with a roll core and with, formed on the roll core, a resilient roll covering, the composition of which is as described above.

The present invention moreover provides the use of the roll described above in a machine for manufacturing paper, paperboard or tissue, and preferably for surface finishing, in particular for sizing, coating and/or pigmentation, or for drainage of an appropriate fiber web.

The roll covering of the invention, or the roll, is in principle suitable for all types of applications in the machine mentioned in the introduction. Particularly good results can be achieved in high-temperature applications, for example when the roll is a press roll of a heatable or heated drying cylinder (Yankee cylinder). The invention also provides a combination of such a drying cylinder with a roll of the invention configured as press roll, where drying cylinder and press roll are in direct contact with one another during correct operation and together delimit or form a press nip through which, during correct operation, the fiber web can be passed for thermal treatment of same.

Finally, the invention provides, for the production of a roll covering or of a roll, a use of a polymer which is a blend of at least one rubber and one millable polyurethane rubber, where the polymer comprises from 65% by weight to 85% by weight of the at least one rubber and from 15% by weight to 35% by weight of millable polyurethane rubber.

BRIEF DESCRIPTION OF THE SINGLE VIEW OF THE DRAWING

The invention will now be explained by way of example with reference to the single FIGURE.

The FIG. is a not to scale depiction of a roll in cross section through the longitudinal axis of same.

DESCRIPTION OF THE INVENTION

The FIG. shows an embodiment of a roll 1 of the invention in cross section through the longitudinal axis of same, which in the present case runs perpendicularly to the plane of depiction. The roll 1 has a cylindrical roll core 3 and a roll covering 4 covering the curved surface of the roll core 3. The roll covering 4 has been produced from a plurality of layers and in the present case comprises an intermediate layer 6.

In the present case, there is a functional layer 7 which lies directly on the intermediate layer 6 and during correct operation of the roll 1 can be brought into at least indirect contact with a fiber web 2. As depicted in FIG. 1, during correct operation of the machine in which the roll 1 has been installed, said web becomes wrapped in circumferential direction at least to some extent around the radially outermost surface of the roll covering 4.

The functional layer 7 has been produced in accordance with the invention. It comprises a material mixture, i.e. a blend made of a millable elastomeric polyurethane rubber and of at least one other rubber, for example NBR, HNBR or a mixture of these two.

As indicated by the broken line, the functional layer could have been produced from two layers. It would also be conceivable in principle that more than two layers are present. The layers can then be identical or else can have been produced with different compositions.

In the present case there are fillers 8 embedded in the (radially outermost) functional layer 7. The functional layer 7 therefore serves as matrix for the solid fillers 8. These can in principle take the form of particles or of fibers. However, the fillers 8 are not essential, and are added as required by a particular application to the functional layer 7. They can be selected as described in the introduction. If a plurality of layers is provided, such fillers 8 can be provided in each individual layer. The layers can be configured in accordance with the invention. The radially outermost layer is then termed functional layer.

There can be a tie layer 5 provided to improve the adhesion of the intermediate layer 6 or of any other under side arranged directly on the roll core 3. Said tie layer is arranged between roll core 3 and intermediate layer 6 in radial direction in relation to the longitudinal axis of the roll. Said tie layer 5 can possibly be omitted if not required in a particular application; the intermediate layer 6 or the functional layer 7 would then come into direct contact with the roll core 3.

Although it is not shown, it would in principle be possible to omit said intermediate layer 6. In such a case, the functional layer 7 would be arranged on the roll core 3 directly or indirectly by way of a tie layer 5.

A roll provided with said roll covering has firstly particularly advantageous mechanical properties, for example very low susceptibility to cracking, excellent impact resistance and excellent abrasion resistance. Secondly, by virtue of the selection of material in accordance with the invention the roll covering also has exceptionally good heat resistance.

A heatable or heated drying cylinder 9 is at least indirectly in contact with the roll and together they delimit a press nip 10.

What is claimed is:

1. A roll covering, comprising:
   a functional layer formed of a polymer being a blend of at least one rubber and one millable polyurethane rubber;
   said millable polyurethane rubber having characteristics of having been produced by a reaction of a polyol with a diisocyanate and a crosslinking agent; and
   said polymer including from 65% by weight to 85% by weight of said at least one rubber and from 15% by weight to 35% by weight of said millable polyurethane rubber.

2. The roll covering according to claim 1, which further comprises a proportion of said millable polyurethane rubber of from 20% by weight to 30% by weight in said polymer.

3. The roll covering according to claim 1, which further comprises a proportion of said millable polyurethane rubber of from 22% by weight to 28% by weight in said polymer.

4. The roll covering according to claim 1, wherein said at least one rubber is selected from the group consisting of crosslinked natural rubbers, crosslinked nitrile rubbers (NBR), crosslinked hydrogenated nitrile rubbers (HNBR), crosslinked carboxylated nitrile rubbers, styrene-butadiene rubbers (SBR), ethylene-propylene-diene rubbers (EPDM) and any desired mixtures of two or more of said crosslinked rubbers.

5. The roll covering according to claim 1, which further comprises:
   at least one inorganic filler;
   said functional layer being at least one functional layer serving as a matrix for said at least one inorganic filler embedded in said at least one functional layer; and said at least one inorganic filler being a compound selected from the group consisting of aluminum oxide, titanium dioxide, zirconium dioxide, yttrium oxide, silicon dioxide, chromium oxide, chromium carbide, titanium carbide, boron carbide, tungsten carbide, aluminum carbide, boron nitride, aluminum nitride, chromium nitride, niobium nitride, chromium carbonitride, titanium carbonitride, boron carbonitride, tungsten carbonitride, diamond, aluminum silicates, aluminum sodium silicates, calcium silicates, calcium sodium silicates and any desired mixtures of two or more of said compounds.

6. The roll covering according to claim 1, wherein said polyol is a polyether polyol or a polyester polyol or a mixture of said polyols.

7. The roll covering according to claim 1, wherein said diisocyanate includes methylenediphenyl isocyanates (MDI), naphthylene 1,5-diisocyanate (NDI), toluene 2,4-diisocyanate (TDI), phenylene 1,4-diisocyanates (PPDI), polycarbonates or polycarbonatediols (PCDL) or a mixture of said diisocyanates.

8. A roll covering, comprising:
a functional layer formed of a polymer being a blend of at least one rubber and one millable polyurethane rubber;
said at least one rubber being a crosslinked nitrile rubber (NBR), a crosslinked hydrogenated nitrile rubber (HNBR) or a mixture of said crosslinked rubbers;
said polymer including from 65% by weight to 85% by weight of said at least one rubber and from 15% by weight to 35% by weight of said millable polyurethane rubber; and
a mixture having a proportion of said crosslinked hydrogenated nitrile rubber (HNBR) relative to said crosslinked nitrile rubber (NBR) not exceeding 50% by weight.

9. A roll, comprising:
a roll core; and
formed on said roll core, a roll covering according to claim 1.

10. The roll according to claim 9, which further comprises a plurality of layers mutually superposed in radial direction of said roll covering, said functional layer forming a radially outermost layer of said roll covering.

11. The roll according to claim 9, which further comprises an intermediate layer disposed radially within said functional layer in radial direction of said roll covering.

12. The roll according to claim 11, wherein said intermediate layer is harder than said at least one functional layer.

13. A method of using a roll in a machine for manufacturing paper, paperboard or tissue, the method comprising the following steps:
providing a roll including a roll core and, formed on the roll core, a roll covering having a functional layer produced from a polymer being a blend of at least one rubber and one millable polyurethane rubber, the millable polyurethane rubber having characteristics of having been produced by a reaction of a polyol with a diisocyanate and a crosslinking agent, and the polymer including from 65% by weight to 85% by weight of the at least one rubber and from 15% by weight to 35% by weight of the millable polyurethane rubber; and
using the roll for surface finishing, drainage, sizing, coating or pigmentation of a fiber web including a paper web, a paperboard web or a tissue web.

14. A combination, comprising:
a roll including a roll core and, formed on said roll core, a roll covering having a functional layer formed of a polymer being a blend of at least one rubber and one millable polyurethane rubber, said polymer including from 65% by weight to 85% by weight of said at least one rubber and from 15% by weight to 35% by weight of said millable polyurethane rubber; and
a heatable or heated drying cylinder;
said roll and said drying cylinder being at least indirectly in contact with one another and together delimiting a press nip.

* * * * *